United States Patent [19]

Keenan

[11] Patent Number: 5,531,890
[45] Date of Patent: Jul. 2, 1996

[54] OIL SEPARATION AND DISPOSAL SYSTEMS

[75] Inventor: Alexander J. Keenan, Ancorage, Ak.

[73] Assignee: Atlantic Richfield Company, Los Angeles, Calif.

[21] Appl. No.: 434,265

[22] Filed: May 3, 1995

Related U.S. Application Data

[63] Continuation-in-part of Ser. No. 68,936, May 28, 1993, abandoned.

[51] Int. Cl.$^6$ .................................................. B01D 17/022
[52] U.S. Cl. ...................... 210/242.4; 210/923; 210/924; 210/242.3; 210/DIG. 5
[58] Field of Search ............................... 210/242.3, 242.4, 210/DIG. 5, 265, 691, 692, 693, 791, 792, 793, 924, 923

[56] References Cited

U.S. PATENT DOCUMENTS

| | | | |
|---|---|---|---|
| 2,405,838 | 7/1946 | Lawson et al. | 210/DIG. 5 |
| 2,432,317 | 12/1947 | Lawson et al. | 210/691 |
| 2,651,414 | 9/1953 | Lawson | 210/691 |
| 3,231,091 | 1/1966 | Kingsbury et al. | 210/DIG. 5 |
| 3,454,490 | 7/1969 | Wallace | 210/638 |
| 3,662,891 | 5/1972 | Headrick | 210/242.3 |
| 3,770,626 | 11/1973 | Ayers | 210/693 |
| 3,800,945 | 4/1974 | Fowler | 210/680 |
| 3,933,654 | 1/1976 | Middlebeck | 210/923 |
| 3,966,614 | 6/1976 | Ayers | 210/242.3 |
| 4,049,554 | 9/1977 | Ayers | 210/242.3 |
| 4,053,414 | 10/1977 | in'tVeld | 210/DIG. 5 |
| 4,059,528 | 11/1977 | Grosshandler | 210/282 |
| 4,064,054 | 12/1977 | Anderson et al. | 210/DIG. 5 |
| 4,116,835 | 9/1978 | Bertelson | 210/DIG. 5 |
| 4,151,087 | 4/1979 | Sakaguchi | 210/DIG. 5 |
| 4,213,863 | 7/1980 | Anderson | 210/DIG. 5 |
| 4,257,895 | 3/1981 | Murdock | 210/243 |
| 4,302,337 | 11/1981 | Larson et al. | 210/693 |
| 4,305,830 | 12/1981 | Shimura | 210/242.3 |
| 4,487,694 | 12/1984 | Brandt et al. | 210/242.3 |
| 4,530,760 | 7/1985 | Shimura | 210/242.3 |
| 4,588,501 | 5/1986 | Jordan | 210/242.3 |
| 4,591,441 | 5/1986 | Sakai | 210/DIG. 5 |
| 4,653,421 | 3/1987 | Ayers et al. | 210/242.3 |
| 4,705,773 | 11/1987 | LeKhac | 502/402 |
| 4,731,067 | 3/1988 | LeKhac | 604/367 |
| 4,743,244 | 5/1988 | LeKhac | 604/376 |
| 4,788,237 | 11/1988 | LeKhac | 524/55 |
| 4,813,945 | 3/1989 | LeKhac | 604/367 |
| 4,935,152 | 6/1990 | Gonzales | 210/747 |
| 4,980,070 | 12/1990 | Lieberman | 210/522 |
| 5,160,432 | 11/1992 | Gattuso | 210/242.3 |
| 5,196,117 | 3/1993 | Warne, Jr. | 210/DIG. 5 |
| 5,443,724 | 8/1995 | Williamson et al. | 210/DIG. 5 |

*Primary Examiner*—Cynthia L. Nessler
*Attorney, Agent, or Firm*—Michael E. Martin

[57] ABSTRACT

Oil-separation and recovery from marine oil spills is carried out by a system which includes a containment boom, a weir and/or foil type skimmer, a separator unit and a second, fire proof containment boom for receiving separated oil in a closed containment area on the surface of the body of water from which the oil has been recovered and wherein the oil may be combusted. The separator unit uses so-called super-absorbent materials including sheets of non-woven fibers or flakes of materials including sodium carboxymethyl cellulose, acrylonitrile grafted starch absorbents, polyacrylates, copolymers of styrene and maleic anhydride and copolymers of unsaturated monomers and recurring units of at least one copolymerizable comonomer comprising about 20% to about 80% pendant carboxylic acid units and about 80% to about 20% pendant carboxylate salt units blended with a monomer containing at least two hydroxyl groups. The separator unit includes a tank with spaces defined in part by the sheets of absorbent materials disposed such that water may flow through the absorbent sheets and oil is collected and removed from one side of the space defined by the sheets.

5 Claims, 4 Drawing Sheets

OIL SEPARATION AND DISPOSAL SYSTEMS

This is a continuation of application Ser. No. 08/068,936 filed on May 28, 1993, now abandoned.

BACKGROUND OF THE INVENTION

1. Field of the Invention

The present invention pertains to systems for recovering and separating oil from water and disposing of the oil and which are particularly adapted for use in marine oil spills.

2. Background

Operations for recovering oil from marine oil spills, separating the oil from water and storing or disposing of the oil continue to be beset by problems involving the use of known methods and systems. Marine oil spills, in particular, present problems in gathering oil from relatively large areas where it has spread on the surface of a body of water, separating the oil layer from water and then handling the recovered oil to either store it or dispose of it in an efficient manner. Recovery of oil floating on the surface of relatively calm bodies of water can be carried out using floating booms or barriers which contain the oil and which also are effective in channeling the oil toward a separation system.

One shortcoming of known types of separation systems is the inability to handle relatively large volumes of oil-water mixtures and provide effective separation of the oil from the water so that the water may be disposed of by merely returning it to the river, lake or ocean from which it was withdrawn. Disposal of the recovered oil is also a problem in that, if the oil has been exposed to atmospheric conditions for more than several hours, its usefulness as a refinery feedstock is diminished and, if suitable storage and transport facilities are not available, final disposal must be carried out without delay to avoid loss of the oil from a contained area on the body of water, for example. In other words, the oil may eventually become a tar-like substance after the more volatile components of the oil evaporate and the residue is likely to sink, thereby contaminating the sea bed. With these problems in mind, the present invention has been developed with a view to providing a more efficient and effective oil-water separation, recovery and disposal system.

SUMMARY OF THE INVENTION

The present invention provides an improved oil-water separation apparatus and material and which is used in conjunction with a unique oil recovery and disposal system for recovering oil from a marine oil spill.

In accordance with one important aspect of the present invention, an improved oil-water separator or filter is provided which utilizes improved absorbent materials or so-called "superabsorbents" which are operable to absorb water but not oil and thereby effect separation of water from oil in applications such as recovering oil from marine oil spills. In particular, apparatus is provided which utilizes water absorbent compositions which may include sodium carboxymethyl cellulose, carboxymethyl cellulose fibers, poly (acrylic acid) salts, poly (ether)-based non-ionic xerogellants, polyacrylate film and laminates, grafted starches, poly (vinyl alcohol sodium acrylate), poly (isobutylene-co-sodium maleate). In particular, a fibrous superabsorbent comprising a copolymer of styrene and maleic anhydride and a multi-arm block copolymer of styrene and ethylene oxide is considered desirable. Absorbent compositions may also be used comprising copolymers of recurring units of at least one alpha, beta-unsaturated monomer and recurring units of at least, one copolymerizable comonomer comprising about 20% to 80% pendant carboxylic acid units and about 80% to 20% pendant carboxylate salt blended with at least one monomer containing at least two hydroxyl groups. These compositions are formable into woven or unwoven fabric mats and are arranged in a unique oil-water separation unit for separating relatively large quantities of oil and water such as may be recovered from a marine oil spill.

In accordance with another important aspect of the present invention, a system is provided for recovering and disposing of relatively large quantities of oil on a body of water using the above-mentioned fabric type water-oil separator wherein the separator apparatus is disposed in a vessel which is in communication with a large quantity of oil floating on the surface of a body of water and contained by suitable containment booms. The vessel is operable to discharge separated water overboard back into the body of water from which it came and the recovered oil is pumped to a containment area on the body of water where it is disposed of by combustion.

The systems of the present invention are particularly adapted for emergency use, relatively inexpensive to construct, may be quickly deployed and are viewed to be very effective on large, as well as relatively minor, marine oil spills.

Those skilled in the art will further appreciate the above-mentioned features and advantages of the present invention, together with other superior aspects thereof, upon reading the detailed description which follows in conjunction with the drawing.

DESCRIPTION OF A PREFERRED EMBODIMENT

Figure 1:
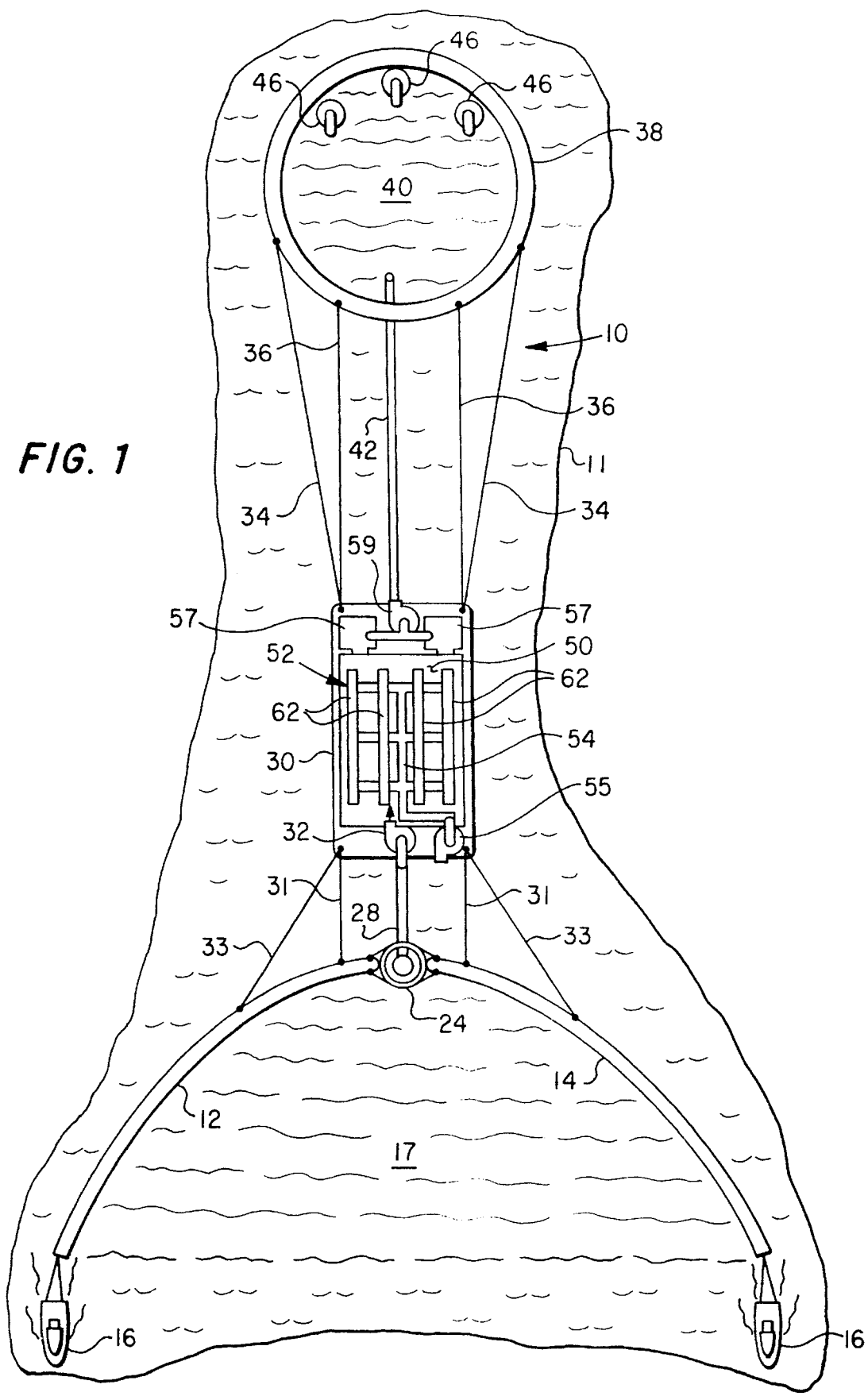
FIG. 1 is a plan view, in somewhat schematic form, of an oil recovery, separation and disposal system in accordance with the present invention.

In the description which follows, like parts are marked throughout the specification and drawing with the same reference numerals, respectively. The drawing figures are not necessarily to scale and certain features of the invention are shown in somewhat schematic form in the interest of clarity and conciseness.

Figure 2:
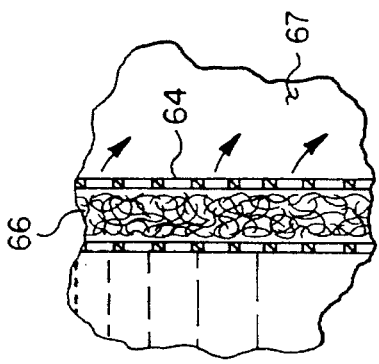
FIG. 2 is a detail view of a unique containment boom for the system of the present invention.

FIG. 1 is a plan view of a recovery system for recovering oil from a marine oil spill which includes several novel features. The system illustrated in FIG. 1 is generally designated by the numeral 10 and is characterized by an arrangement of two generally oppositely projecting oil containment booms 12 and 14 which may be deployed in a conventional manner and towed by tow vessels 16 to encircle a marine oil spill 17 and contain the spill for separation and disposal of the oil in accordance with present invention. The containment booms 12 and 14 may include elongated tubular buoyancy members 15, FIG. 2, of the inflatable type or made of buoyant material. The booms 12 and 14 may also be provided with depending flexible skirts 18, see FIG. 2, which also serve as means for storing oil and water. The skirts 18 are actually closed, collapsible envelopes which are provided with suitable connectors 20 at selected points for connecting a pump, not shown, to fill a containment space 21 with oil or oily water for storage and later treatment. A stability enhancing weight comprising a metal rod or cable 23 may extend along the bottom of the skirt 18. The buoyancy members 15 and skirts 18 may be integral and formed of an oil resistant elastomer, for example.

The skirts 18 therefore serve as storage vessels as well as containment means. Moreover, certain bioremediation processes may be carried out by injecting bioremediation materials into the spaces 21 formed by the skirts 18 to convert the hydrocarbons, for example, to materials which are easily disposable in the body of water 11 on which the spill has occurred. Other types of booms such as high buoyancy internal foam flotation types, medium buoyancy externally attached float types and self-inflation types may be utilized. Several commercial sources are available for booms of the aforementioned types except for the type which includes the collapsible envelope type skirt which serves as a storage area and has been described above in conjunction with FIG. 2.

The booms 12 and 14 are connected at their respective ends opposite the ends connected to the towing vessels 16 to a floating weir type oil skimmer 24 which is connected to a conduit 28. The conduit 28 leads to a separator apparatus including a vessel such as an open hopper barge 30 onboard which a suitable suction pump 32 is provided for withdrawing oil from the body of water 11 which has been collected and contained between the booms 12 and 14 and skimmed from the water surface by the skimmer 24. The skimmer 24 may be one of several types commercially available. A certain amount of water is inevitably withdrawn through the skimmer 24 with the oil floating on the surface of the body of water 11. Accordingly, the barge 30 includes a unique separator unit for separating oil from water and which will be described in further detail herein.

As illustrated, the barge 30 is also preferably connected to the booms 12 and 14 by suitable towing cables 31 and 33. The barge 30 is also connected by way of suitable towing cables 34 and 36 to a fire-resistant containment boom 38 floating on the surface of the water 11 and defining a closed containment area 40 on the water surface. The boom 38 may be of a type available from 3M Corporation of St. Paul, Minn. The closed area 40 within the confines of the boom 38 is supplied with recovered oil by way of a conduit 42 which receives oil from the barge 30 which has been separated from water by the improved separator unit to be described below. The oil recovered and contained within the area 40 may await recovery by a suitable oil recovery vessel or the oil may be disposed of by combustion utilizing one or more floating ignitor and flame sustenation devices 46 which may be of a type described in my U.S. patent application Ser. No. 08/033,216, filed Mar. 18, 1993, and assigned to the assignee of the present invention.

Figure 4:
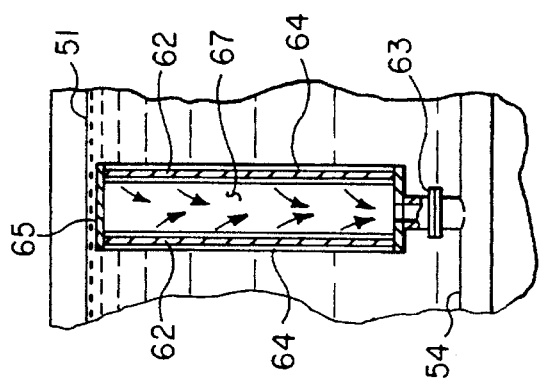
FIG. 4 is a section view taken from line 4—4 of FIG. 3.
Figure 3:
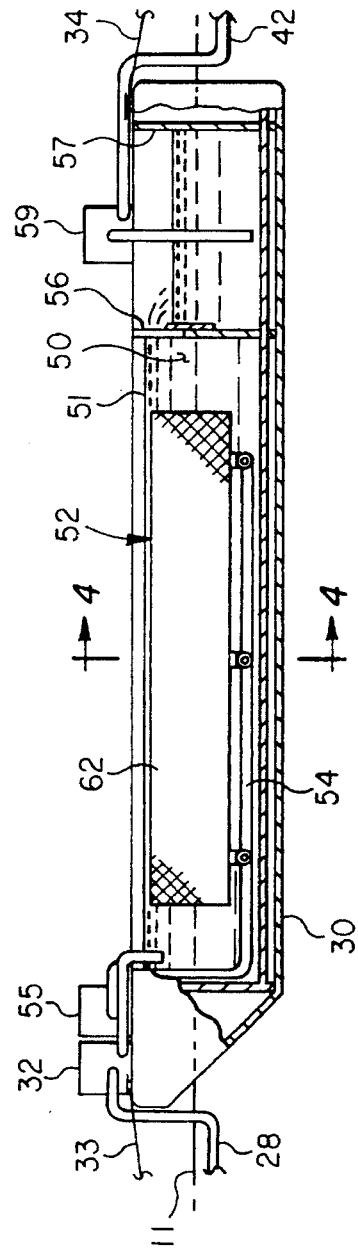
FIG. 3 is a longitudinal section view of one embodiment of an oil-water separation apparatus according to the invention.

Referring now to FIGS. 3 and 4, FIG. 3 illustrates, in somewhat schematic form, the barge 30 which includes an interior space 50 in which an oil-water separation unit in accordance with the present invention is disposed and generally designated by the numeral 52. Water and oil drawn from the area contained by the booms 12 and 14 through the conduit 28 is discharged into the space 50 and water is separated from oil by the separation unit 52 and flows through a conduit or manifold 54 to a pump 55, see FIG. 1 also, and is discharged overboard the barge 30. Accordingly, the space 50 is occupied by a substantial amount of oil as the oil-water separation process takes place. Controlled discharge of oil from space 50 occurs through one or more weirs 56 to holding tankage 57 from which the oil is pumped by way of a pump 59 through the conduit 42 to the containment area 40.

Figure 5:
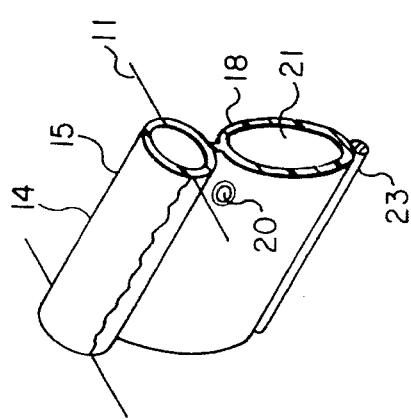
FIG. 5 is a detail section view showing certain features of one of the oil-water separator units using the super absorbent materials.

FIG. 4 illustrates the configuration of one of the several oil-water separators 62 of the separator unit 52. Each of the separators 62 is suitably connected to the water outlet manifold 54 by a suitable coupling 63. The separators 62 are each characterized by generally rectangular foraminous planar frames 64 and are supported spaced apart from each other by a rectangular, perimeter frame 65 to define a space 67 in flow communication with the manifold 54. The foraminous frames 64 form generally rectangular shallow boxes supporting therewithin a sheet-like quantity of absorbant material 66, see FIG. 5, which is operable to absorb and drain water therethrough into the space 67 and to manifold 54 and to refuse absorption of oil. Accordingly, such oil remains basically in the space 50, as indicated by the numeral 51 in FIG. 3.

The absorbent material 66 is preferably formed as generally planar sheets of a woven, non-woven or needle-punched fabric of relatively small diameter fibers of water absorbent materials described hereinbefore and supporting structure therefor. For example, the fabric sheets 66 may comprise fibers about 20 denier and about 0.25 inches to 1.50 inches long of an absorbent material manufactured by ARCO Chemical Company, Newtown Square, Pa., under the trademark Fibersorb, bonded or woven together with fibers of an inert material such as polypropylene, polyolefins, polyesters and cotton. The absorbent material fibers may comprise from about 3% to 60% of the total fibers, preferably about 20% for an oil-water separator. Compositions for the absorbent sheets 66 which have been indicated to be superior are described in U.S. Pat. Nos. 4,705,773, issued Nov. 10, 1987; 4,731,067, issued Mar. 15, 1988; 4,743,244, issued May 10, 1988; 4,788,237, issued Nov. 29, 1988 and 4,813,945, issued Mar. 21, 1989, all to Le-Khac and assigned to ARCO Chemical Technology, Inc. The water insoluble and absorbing compositions described in these patents comprise a copolymer of styrene and maleic anhydride and a multi-arm block copolymer of styrene and ethylene oxide or a copolymer of recurring units of at least one alpha, beta unsaturated monomer and recurring units of at least one copolymerizable comonomer comprising from about 20% to about 80% pendant carboxylic acid units and from about 80% to about 20% pendant carboxylate salt units blended with at least one monomer containing at least two hydroxyl groups which produces a superior water absorbing composition on curing.

As previously mentioned, the level of liquid in the space 50 is controlled by exit weir means 56 which maintains the separators 62 substantially covered with liquid and allows oil separated by the separator unit 52 to exit the space 50 into the holding tank 57 from which the oil is pumped by way of pump 59 through the conduit 42 to the containment space 40.

In operation of the system 10, a quantity of oil floating on the surface of a body of water, such as the body 11 may be contained and collected by towing or maintaining the booms 12 and 14 in a position to collect and contain a substantial amount of the oil. Pumps 32, 55 and 59 are operated to maintain a balanced flow of an oil-water mixture into the space 50 and to withdraw separated water and oil from the space 50 and the holding tank 57. The position of weir 56 may be adjusted to control the height of the liquid in the space 50 to assure that the oil-water separators 62 are maintained covered with liquid. As oil is withdrawn from the holding tank 57, it is pumped into the containment space 40 or to a suitable recovery vessel. If the recovered oil is to be combusted as a means of disposal, the ignitors 46 are activated periodically to maintain combustion of the contained oil floating in the space 40. The pump 55 may be reversed and, drawing from an area of clean water, operated to backflush the separation unit 52 from time to time.

Figure 6:
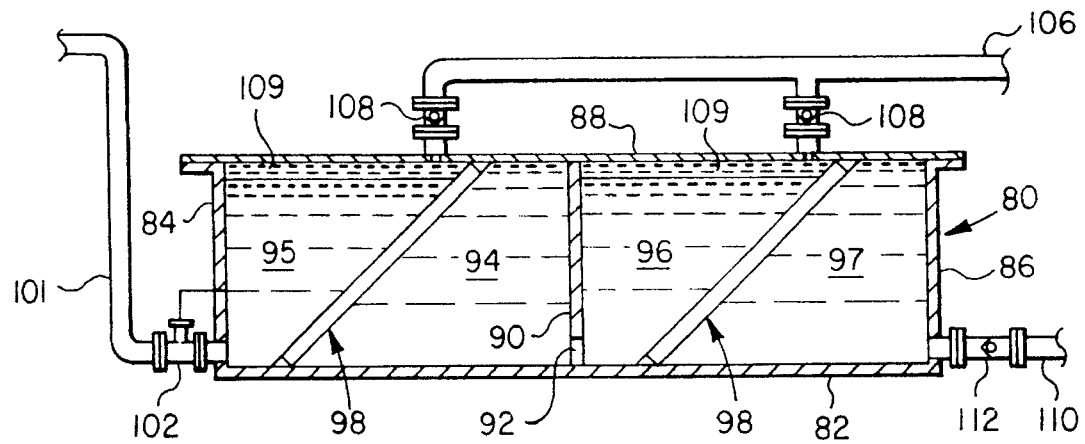
FIG. 6 is a central section view of an alternate embodiment of an oil-water separator unit.
Figure 7:
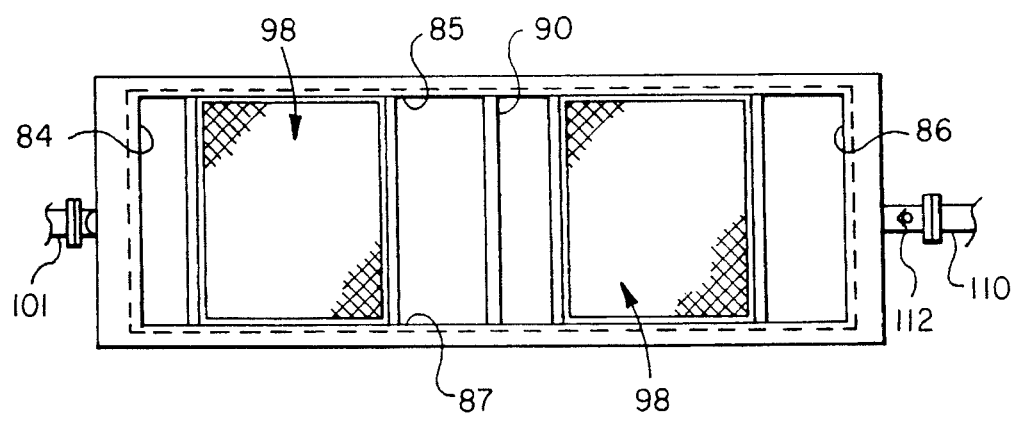
FIG. 7 is a plan view of the separator unit of FIG. 6.

Referring now to FIGS. 6 and 7, there is illustrated another embodiment of an oil-water separator unit which utilizes the advantageous features of the absorbent materials described above and may also be used in conjunction with the oil recovery and disposal system 10. FIG. 6 illustrates a closed tank 80 of generally rectangular configuration having a bottom wall 82, opposed end walls 84 and 86, opposed sidewalls 85 and 87, FIG. 7, and a removable top wall 88. The top wall 88 has been removed in FIG. 7 to illustrate certain features of the invention. A baffle 90 is disposed in the interior of the tank 80 and depends from the top wall 88 and extends between the sidewalls 85 and 87. The lower edge of the baffle 90 delimits a passage 92 between a space or chamber 94 and a space or chamber 96 which are both delimited by generally rectangular oil-water separators 98, respectively, which are suitably supported within the tank 80 and extend between the top and bottom walls and the sidewalls of the tank, as illustrated. The tank 80 may be disposed on the barge 30 in place of the separator 52 or on other suitable vessels, not shown.

Figure 8:
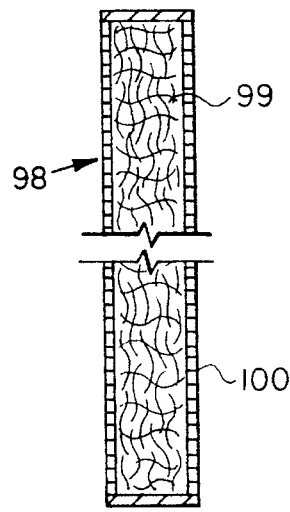
FIG. 8 is a detail section view of a portion of one of the separator elements of the separator unit shown in FIGS. 6 and 7.

The oil-water separator elements 98 of the embodiment described in conjunction with FIGS. 6, 7 and 8 comprise sheets or mats 99, FIG. 8, of fibers or flakes of the absorbent materials described above supported by a needle-punched or non-woven fabric matrix and enclosed within a suitable shallow, rectangular, box-like and foraminous perimeter frame 100. The separator elements 98 are disposed inclined with respect to the bottom and top walls 82 and 88, as illustrated, preferably at about a 45° angle to the bottom wall 82 to form additional spaces or chambers 95 and 97 within the interior of the tank 80. An inlet conduit 101 opens into the space 95 for conducting an oil-water mixture thereinto. A suitable shut-off valve 102 is interposed in the conduit 101, as illustrated, and is responsive to a predetermined maximum pressure in the space 95 to throttle or completely shut off flow into such space. The spaces 95 and 96 are in communication with an oil outlet conduit 106 which has interposed therein respective minimum pressure or pressure relief valves 108 of conventional design and operable to open in response to accumulation of an oil layer 109 near the junction of the separator elements 98 with the top wall 88. A water outlet conduit 110 is in communication with the space 97 for removing water which has been separated from oil within the tank 80. A third minimum pressure or pressure relief valve 112 is interposed in the conduit 110 and is set at a pressure which will allow this valve to open which is slightly less than the opening pressure of the valves 108. In this way a water-oil mixture flowing from the conduit 101 into the space 95 will undergo separation, thanks to the configuration and characteristics of the separator elements 98. Although separation of oil from water by the first element 98 may not be one hundred percent, oily water flowing from the space 95 to the chamber 94 and through the passage 92 into the space 96 will flow through the second separator element 98, whereby additional oil separation will take place as substantially oil-free water flows into the space 97. Oil which cannot be absorbed by or flow through the elements 98 will collect in the spaces 95 and 96, as shown, near the junction of the separator elements with the top wall 88 and then flow through the relief valves 108 and the conduit 106.

The superior oil-water separator units described above and shown in the drawing include the above-mentioned materials which have a characteristic which permits a liquid such as water to bond to the fibers or flakes of the compositions described and which are included in the separators. The liquid water bonds to the materials of the fabric sheets or matrices and attract other free-flowing water, or a molecule of water exchanges places with a water molecule bonded to the matrix, thereby allowing the earlier bonded molecule to pass through the matrix. Fortunately, the materials described above will not react with liquids such as hydrocarbon oils and the like, and these liquids will be repelled or refused, substantially, to be permitted to pass through the barrier formed by the separator units.

Figure 9:
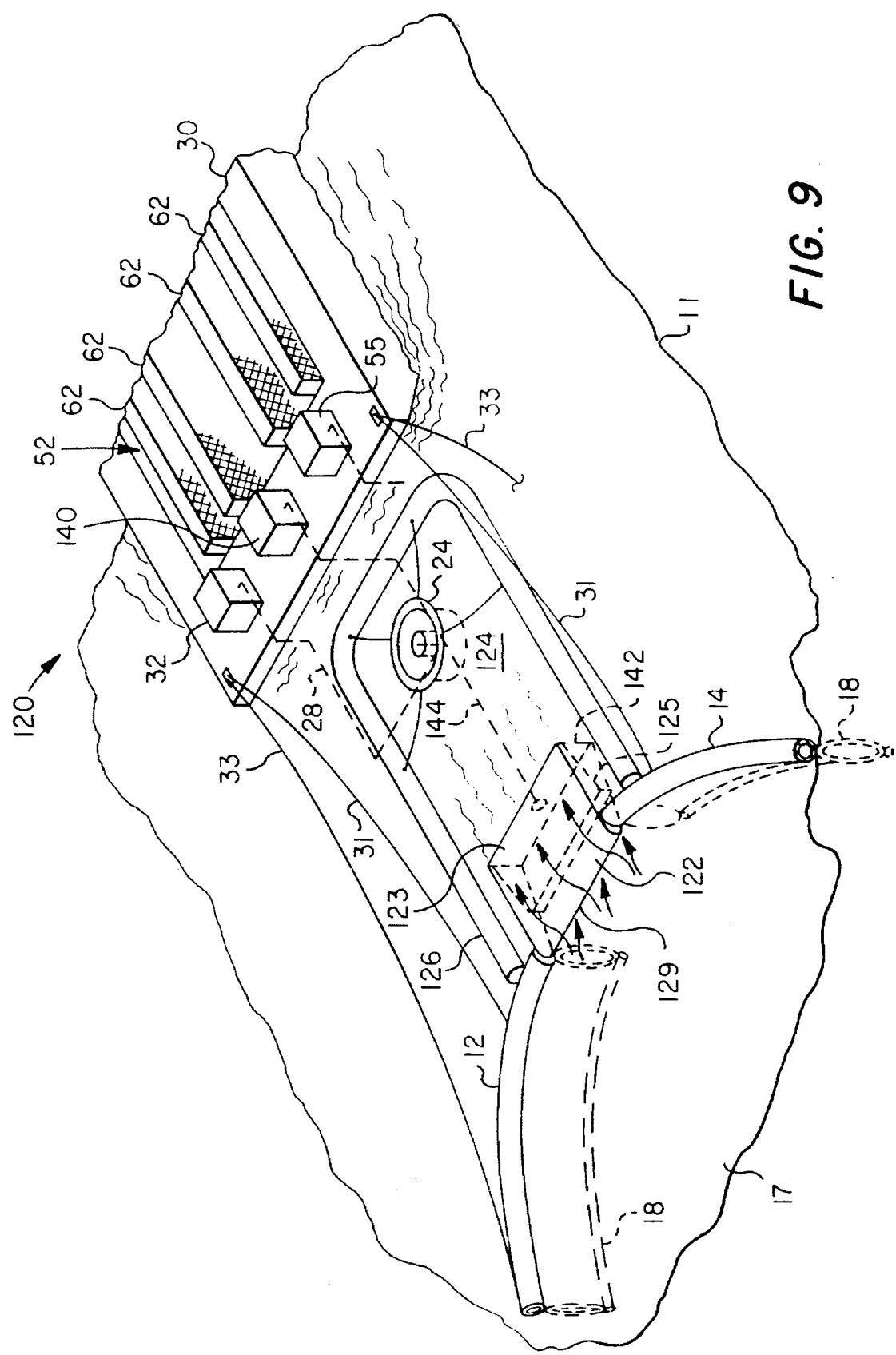
FIG. 9 is a perspective view of another embodiment of the present invention.

Referring now to FIG. 9, there is illustrated, in somewhat schematic form, an alternate embodiment of a system in accordance with the present invention and generally designated by the numeral 120. The system 120 includes the oil gathering booms 12 and 14 which, instead of being connected directly to the weir type skimmer 24, are connected at their adjacent ends to a foil 122 which has a profile operable to create flow of oil over the top side 123 of the foil while water tends to flow under the foil. Accordingly, the foil 122 tends to concentrate or skim oil from the surface of the sea 11 at a collection point between the booms 12 and 14, which oil is concentrated in an area 124 delimited by a third boom 126. The boom 126 forms a generally rectangular enclosure together with the booms 12 and 14 and the foil 122. The oil flowing over the top surface 123 of the foil 122 is concentrated in the area 124 and removed therefrom by the weir type skimmer 24 which is in communication with pump 32 by way of the conduit 28.

The foil 122 is operable to perform its oil separation and concentration function as the system 120 is towed through the oil spill or slick 17 in the same manner as the system 10. However, the flow of oil/water with respect to the foil 122 may be enhanced during periods when the system 120 is not moving relative to the oil spill 17. In this regard, a suitable pump 140 is provided on board the barge 30 and is in communication with a generally rectangular plenum 142 formed on the underside 125 of the foil 122. The plenum 142 has an open side facing the leading edge 129 of the foil 122. The pump 140 is operable to induce flow of water into the plenum 142 to be withdrawn through a conduit 144 in communication with the pump 140. In this way, an oil slick 17 may be induced to be recovered by being separated from the underlying water by inducing water flow into the plenum 142 and forcing oil to separate from the water and flow over the top surface 123 of the foil to be concentrated in the area 124. Water withdrawn by the pump 140 may be discharged into the space 50 to undergo separation by the separation system 52 together with the oil laden water which is withdrawn from the area 124 by the pump 32.

Those skilled in the art will recognize that the water foil 122 presents a unique oil separation and concentrating device which may be used in conjunction with the systems 10 and 120. The foil 122 may be supported for adjustment of its angle of attack or pitch to accommodate different oil slick conditions and the amount of water drawn under the foil may be controlled by the pump 140 or by the speed of movement of the system through the oil slick 17. The foil 122 may be supported by the booms, be constructed to have essentially neutral buoyancy or be supported by other buoyant structure, not shown. The angle of attack or pitch of the foil 122 may be adjusted by suitable mechanism, also not shown.

Although preferred embodiments of the present invention have been described in some detail herein, those skilled in the art will recognize that various substitutions and modifications may be made to the oil recovery and separator systems described without departing from the scope and spirit of the invention, as recited in the appended claims.

What is claimed is:

1. A system for separating oil and water from an oil-water mixture, said system comprising:

a tank, said tank defining means for containing said oil-water mixture;

a first chamber in said tank;

an oil-water inlet conduit in fluid communication with said first chamber, said inlet conduit defining means for introducing said oil-water mixture into said tank;

an oil-water separator element effective to permit the passage of water therethrough and to substantially refuse the passage of oil therethrough and dividing said tank to form a well between said first chamber and a second chamber in said tank so that water passes through said element from said first chamber into said second chamber;

an oil recovery line in fluid communication with an upper portion of said first chamber; and a water outlet in fluid communication with a lower portion of said second chamber;

wherein said material consists essentially of a copolymer of styrene and maleic anhydride and a multi-arm block copolymer of styrene and ethylene oxide or a copolymer of recurring units of at least one alpha, beta unsaturated monomer and recurring units of at least one copolymerizable comonomer comprising from about 20% to about 80% pendant carboxylate acid units and from about 80% to about 20% pendant carboxylic salt units blended with at least one monomer containing at least two hydroxyl groups.

2. The system of claim 1 wherein said water outlet is in fluid communication with a third chamber in said tank, said third chamber having one of its walls formed by an oil-water separator element effective to permit the passage of oil therethrough and dividing said tank to form a wall between said third chamber and a fourth chamber in said tank so that water passes through said element from said third chamber into said fourth chamber, said third chamber including an oil recovery line in fluid communication with an upper portion of said third chamber, and said fourth chamber including a water outlet in fluid communication with a lower portion of said fourth chamber.

3. The system of claim 1 wherein said element is inclined relative to a horizontal axis of said tank.

4. The system of claim 1 wherein said material is formed as generally planar sheets of a woven, non-woven or needle punched fabric of relatively small diameter fibers of said material.

5. The invention set forth in claim 1 wherein:

said material is formed as fibers having a length of about 0.25 inches to 1.50 inches and blended with fibers selected from a group consisting of polyolefins, polyesters and cotton.

* * * * *